US00RE35812E

United States Patent [19]

Oliver

[11] E Patent Number: Re. 35,812

[45] Reissued Date of Patent: Jun. 2, 1998

[54] BONDED ABRASIVE GRIT STRUCTURE

[76] Inventor: Lloyd R. Oliver, 7770 Colony Dr., Algonac, Mich. 48001

[21] Appl. No.: 845,603

[22] Filed: Mar. 4, 1992

Related U.S. Patent Documents

Reissue of:

[64] Patent No.: 4,916,869
Issued: Apr. 17, 1990
Appl. No.: 226,442
Filed: Aug. 1, 1988

[51] Int. Cl.[6] ..... B24D 3/02

[52] U.S. Cl. ..... 51/293; 51/295; 51/298; 51/309

[58] Field of Search ..... 51/293, 295, 298, 51/309

[56] References Cited

U.S. PATENT DOCUMENTS

| | | | |
|---|---|---|---|
| Re. 21,165 | 7/1939 | Van Der Pyl | 51/309 |
| Re. 26,879 | 5/1970 | Kelso | 51/295 |
| 1,848,182 | 3/1932 | Koebel | 76/101 R |
| 1,939,991 | 12/1933 | Krusell | 73/231 |
| 2,201,196 | 5/1940 | Williamson | 51/276 |
| 2,205,864 | 6/1940 | Schwarzkopf | 75/22 |
| 2,322,507 | 6/1943 | Cole | 29/188 |
| 2,367,406 | 1/1945 | Kott | 76/101 A |
| 2,396,015 | 3/1946 | Liden et al. | 51/309 |
| 2,427,565 | 9/1947 | Liger | 51/309 |
| 2,694,647 | 11/1954 | Cole | 117/22 |
| 2,798,474 | 7/1957 | Ballhausen | 125/18 |
| 2,828,197 | 3/1958 | Blackmer, Jr. | 51/309 |
| 2,858,256 | 10/1958 | Fahnoe et al. | 204/4 |
| 2,904,418 | 9/1959 | Fahnoe | 51/293 |
| 2,962,808 | 12/1960 | Cole et al. | 29/424 |
| 3,023,490 | 3/1962 | Dawson | 29/194 |
| 3,024,128 | 3/1962 | Dawson | 117/22 |
| 3,037,852 | 6/1962 | White | 51/293 |
| 3,048,482 | 8/1962 | Hurst | 51/298 |
| 3,049,435 | 8/1962 | Shwayder | 117/22 |
| 3,088,251 | 5/1963 | Davis | 51/168 |
| 3,117,845 | 1/1964 | Reed | 29/191.2 |
| 3,128,165 | 4/1964 | Bridwell et al. | 51/307 |
| 3,131,779 | 5/1964 | Rowley et al. | 175/393 |
| 3,149,411 | 9/1964 | Smiley et al. | 29/182.8 |
| 3,206,893 | 9/1965 | Rumbaugh | 51/206 |
| 3,247,301 | 4/1966 | Praeg et al. | 264/225 |
| 3,248,189 | 4/1966 | Harris, Jr. | 51/295 |
| 3,260,579 | 7/1966 | Scales et al. | 29/195 |
| 3,296,693 | 1/1967 | Carter | 29/473.1 |
| 3,598,554 | 8/1971 | Dawson et al. | 51/293 |
| 3,615,309 | 10/1971 | Dawson | 51/309 |
| 3,650,714 | 3/1972 | Farkas | 51/295 |
| 3,818,217 | 6/1974 | Oliver | 51/295 |
| 3,850,590 | 11/1974 | Chalkley et al. | 51/295 |
| 3,860,400 | 1/1975 | Prowse et al. | 51/309 |
| 3,894,673 | 7/1975 | Lowder et al. | 51/309 |
| 4,010,583 | 3/1977 | Highberg | 51/284 |
| 4,018,576 | 4/1977 | Lowder et al. | 51/309 |
| 4,063,909 | 12/1977 | Mitchell | 51/309 |
| 4,114,322 | 9/1978 | Greenspan | 51/206 R |
| 4,142,872 | 3/1979 | Conradi | 51/309 |
| 4,681,600 | 7/1987 | Rhoades et al. | 51/293 |

*Primary Examiner*—Deborah Jones

[57] ABSTRACT

A bonded abrasive grit structure which may be attached to a tool surface and a method for making a grit structure and tool therefrom. The grit structure includes a plurality of peaks which have a grit particle at the apex and are substantially the same height such that the apexes collectively define a plane. A setting matrix of preferably tungsten carbide particulate matter of high melting point surrounds the grit particle. A resin binder is dispersed throughout the structure. The binder is drivable from the structure at a first temperature. The structure is brazeable to a tool surface by infiltration of a brazing material therethrough at a second higher temperature.

32 Claims, 2 Drawing Sheets

BONDED ABRASIVE GRIT STRUCTURE

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to abrasive grit structures used in the grinding and shaping of various materials.

Abrasive grit tool structures such as grinding wheels and the like conventionally have an outer grit particle surface which is used to remove pieces of a workpiece for shaping and finishing a workpiece. In prior structures abrasive grits have been attached to tool surfaces by placing a single layer of grit particles on a tool form and then bonding the grits to the tool by using a brazing metal or by an electroplating coating which grips the grit particles. These structures along with other types of structures have the disadvantage in that the resulting tool may have grits of widely varying heights, erratic grit edges, flat spots or other irregular surfaces which tend to present an uneven grinding surface to the workpiece. In grinding structures the desired effect is to present the abrasive grits to the workpiece at an even level in order to most effectively shape the workpiece. Thus, many of the prior structures have failed to meet this goal.

The electroplated structures have generally used a nickel metal for the electroplating of the metal substrate in order to hold the grit The electroplated layer used in these structures generally had to be of a depth such that the metal would build up on the sides of the grits (i.e. the formation of a meniscus) in order to provide a mechanical grip around the grit particles. This mechanical grip was required because there was generally little or no chemical binding or alloying between the grit particles, particularly diamonds, and the metal material.

Brazing materials such as nickel-chromium alloys which form chromium carbide bonds with diamond particles were also used. Because the stresses and strains imposed on such a structure (particularly when the diamond particles are close to or in contact with a steel substrate) tended to break the chromium carbide bond during cooling, it has generally been required in the past to have such a mechanical gripping bond even when using these types of alloys.

Other grinding wheel structures have been produced by either pressure forming a grinding wheel in a mold, or grinding surfaces have been added to tools by placing the individual tool in a mold and using pressure molding and brazing procedures to attach the grinding surface to a substrate mold surface. As is readily appreciated such procedures are costly, time consuming and require special equipment Additionally, some structures of the past have commonly not provided adequate space between the grinding particles. This results in a diminished useful lifetime of the tool due to particles of the workpiece being lodged between the grit particles or extending over the grit particles such that contact between the individual grit particles and the workpiece is reduced, thereby inhibiting the grinding action.

Diamonds have long been used and are preferred in the art as a grinding grit particle. Because of the nature of diamonds it is hard to create a structure whereby a diamond can be held or bonded to a surface in such a manner that it will not break off during the grinding process. Therefore, it has been a problem in grinding wheels using diamond grits that while initially the diamond grinding wheel worked relatively well, after a period of use the diamond grit particles would eventually break away from the substrate structure. This would reduce the number of actual cutting grit particles which were available to shape or form the workpiece thereby foreshortening the useful life of the tool.

According to the present invention there is provided an abrasive grit structure which may be selectively and securely attached to a substrate tool structure without the use of high pressure or other complex manufacturing methods as was sometimes necessary in the prior art. Thus, with the present invention a grinding tool can be produced at a reduced cost.

The present invention also has the advantage of allowing for efficient use of the grit structure by placing the grit particles in a homogeneous and level pattern wherein each of the grits are configured at substantially the same plane in the final tool surface. The structure of the present invention provides a final grit structure whereby it is substantially ensured that each grit will contact and effectively cut the surface to be ground.

The present invention also allows space between the grit structures which inhibits clogging between the structures whereby the grinding tool life will be extended. The present invention also has the advantage that the diamond or other hard grit like constituent is securely held by the surrounding structure such that it will have a greater bonded life expectancy than such structures produced in the past.

According to the present invention, there is provided a bonded abrasive grit structure which is selectively attachable to a tool surface. The structure includes a plurality of peaked portions on a substrate layer with the peaked portions each having an apex and a base portion. Each of the peaked portions has at least one abrasive grit particle at the apex or others near the apex. The abrasive grit particle is substantially surrounded in the apex by a setting material. The remainder of the structure comprises a particulate matter having a melting point temperature higher than a predetermined temperature (higher than a melting point of a brazing compound to be used in the present invention). A flexible hydrocarbon resin binder is dispersed throughout the structure for temporarily binding together the abrasive grit particles, the setting material and the particulate matter. The hydrocarbon resin binder is volatizable and drivable from the structure at a first relatively low predetermined temperature. The structure is brazable to a tool surface by the infiltration of a brazing material therethrough and onto the tool surface at a second higher temperature which is lower than the melting point of the particulate material.

Other advantages of the present invention will be readily appreciated as the same becomes better understood by reference to the following description when considered in connection with the accompanying drawings.

DESCRIPTION OF THE PREFERRED EMBODIMENTS

Figure 1:
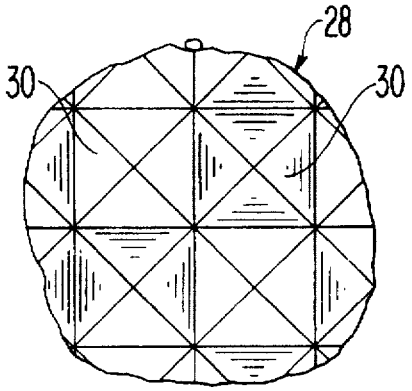
FIG. 1 is a fragmentary plan view of a portion of a molding surface used to produce the abrasive grit structure made in accordance with the teachings of the present invention.
Figure 2:
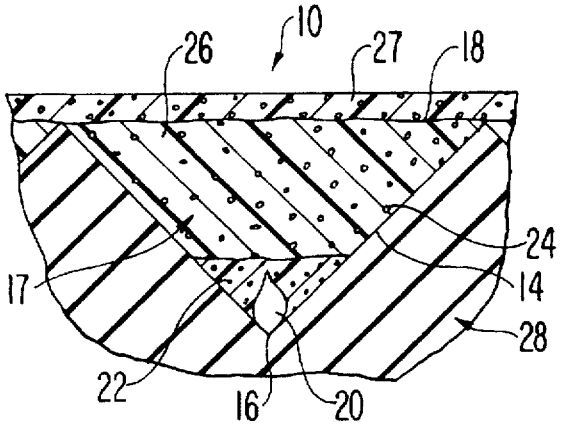
FIG. 2 is a section view of a portion of the molding surface of FIG. 1 showing a typical abrasive peak, the section being taken along a lateral section of a representative peak.
Figure 3:
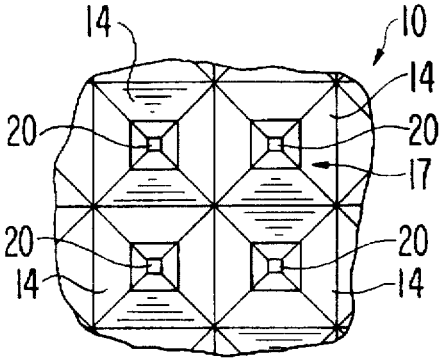
FIG. 3 is a fragmentary plan view of the grit surface produced in accordance with the teachings of the present invention and using the mold of FIG. 1.

Referring now to the drawings, wherein like numbers differing in the amount of one hundred refer to like elements, according to the present invention there is provided an abrasive grit structure 10 which is selectively attachable to a tool surface 12. The abrasive grit structure 10 comprises a plurality of peak portions 14. Each of the peak portions includes an apex portion 16 and a base portion 18. The peaks are substantially the same height such that the peaks are co-planar. At least one abrasive grit particle 20 is provided at each apex 16. The abrasive grit particle 20 is substantially surrounded by a particle setting matrix 17. The particle setting matrix may include a setting material 22 which substantially surrounds the grit particle 20 in and around the apex 16 and a second particulate matter 24 substantially filling the remainder of the peak portion 14. Particulate matter 24 has a melting point temperature which is higher than a predetermined value and in the preferred embodiment of the present invention the melting temperature is higher than the melting point of a brazing alloy used to bond the constituents together.

A flexible hydrocarbon resin binder 26 is dispersed throughout the structure 10. The resin binder 26 is for temporarily binding together the abrasive grit particle 20, the setting material 22 and the particulate matter 24 and for retaining these constituents in their respective positions for later positioning on a tool structure 12. The hydrocarbon resin binder 26 is volatile such that it may be driven from the structure at a first relatively low predetermined temperature. The structure 10 is brazable to a tool surface 12 by the infiltration of a brazing material therethrough and onto the tool surface at a second higher predetermined temperature which is lower than the melting point of the particulate material.

Abrasive grit particles 20 to be used in the present invention may be of any kind of metal carbide, boride grits or grits which are harder than metal carbides and up to and including a diamond like hardness. For instance, various cast or sintered metal carbide grits may be suitably used in the present invention and also, harder grits such as cubic boron nitrite, polycrystalline diamond or natural diamond grits can be used in the present invention, preferably a diamond grit particle may be used. The setting material 22 consists of a material which will provide adequate strength for holding the particle in the structure such as by chemically bonding with the brazing material. In the preferred embodiment of the invention where a diamond or like hard particle is used, the setting material 22 is a fine metal carbide powder.

The setting material 22 is selected such that it may be easily wetted by a brazing compound used in the final brazing of the structure of the present invention. Suitable setting materials are commercially available and are known to those skilled in the art. It has been found that a d.s.p. number 50 setting compound made by Wall Colmonoy Company of Detroit, Mich., would be useful in the present invention.

Preferably, the particulate matter 24 may be of the same material as used in the setting powder 22 such as a metal carbide grit particle material but which particles are larger in size than the powder particles. Alternatively, the particulate material used for layers 22 and 24 may be the same in size and composition and may have a particle size of from about 100 mesh to about micron sized particles. Preferably, a tungsten carbide particle material is used. Particles of crushed cast or sintered tungsten metal group carbides, chromium carbides, chromium borides or a mixture thereof which may also include diamond particles could also be used. The size of the particles used in particulate matter 24 is preferably a 325 mesh or larger particle. The particulate matter useful in the present invention is selected with two factors in mind. The first factor is that the material is wettable with the type of brazing material to be used. The particles also must be substantially non-melting up to and past the temperature for melting of the brazing material used.

These particles, which form the primary constituents of the setting powder 22 and particulate matter 24, are referred to as substantially non-melting constituents of the present invention. It is preferable that particles generally will not melt up to temperatures of about 2150° F. which is at or above the melting temperature of the preferred nickel chromium alloy used in the present invention. A metal carbide such as a tungsten carbide particle is preferred in that the nickel chromium alloy will form a chromium carbide bond to these metallic particulate structures which will strengthen and provide a durable substrate structure and matrix for securely holding the diamond particle 20 in the subsequent structure. However, other brazing compounds which contain metals for forming metal carbide bonds with diamonds or like hardness grit particles may be used in the present invention.

Tungsten group metal carbide particles are particularly suitable as the coefficient of expansion is more near that of a diamond or diamond like hardness material. This allows the tungsten carbide particulate material to act as a "buffer" between the steel tool surface and the diamond particle The use of this tungsten carbide particulate material advantageously acts to prevent the chemical bond breaking of the chromium-carbide bond of conventionally brazed structures. Thus, a final brazed structure having superior bonded strength is formed in the present invention. In an alternate embodiment of the present invention cubic boron nitride particles which do not contain carbon may be used. While such particles may not form chemical bonds with the brazing compounds to be used, these particles will be used to surround the grit particle 20 and will provide a close mechanical grip in the subsequent product.

The particulate matter 24 may be used to fill the mold indentations to form peaks 14 by filling same up to and even with the base 18 of the peaks 14. Alternatively, the mold may be filled above the base to create a substrate layer 27. If the peaks 14 are filled to the base 18, the peaks 14 may be applied to the tool surface directly from the mold by placing a binder or adhesive layer 32 on the tool surface and applying the mold containing the peaks 14 of the grit structure thereon and then removing the mold leaving a tool surface with the abrasive grit peaks 14 adhered thereto. Alternatively, the peaks 14 may be individually separated and individually applied to a tool surface. This structure may then be brazed into a tool structure as set forth below. The substrate layer 27 provides a backing material such that the grit structure may be removed from the mold surface as a sheet and then applied to the tool structure at a later period of time, or alternatively, the grit structure may be removed and the peaks 14 broken apart to allow individual attachment to a tool surface.

The binder 26 which is provided to temporarily bond the particle 20, the powder matrix 22, and the particulate matter 24 in the structure of the present invention may be of a hydrocarbon binder type. The subsequent cured product is preferably flexible to facilitate application to varying shape tool substrates at a later time and therefore, a flexible type binder is preferred for use in the present invention Alternatively, if the final product is to be a brazed homogeneous structure rather than brazed onto a tool for armoring of the tool or if the peaks are to be individually separated or broken apart, it is preferable to use a binder which cures to a stiff type consistency. Acrylic type binders are generally preferred, however, any suitable solvent soluable hydrocarbon material may be used.

In order to practice the method of the present invention a molding surface is provided to create a mold 28 for the peaks in which the structure is created. The mold 28 preferably has a surface having shaped indentations 30 therein for producing the grit structure of the present invention. The mold 28 may be configured in any form which is advantageous to form a grit structure as long as the indentations are substantially the same height such that they are presented in the mold surface along substantially the same plane.

Figure 6:
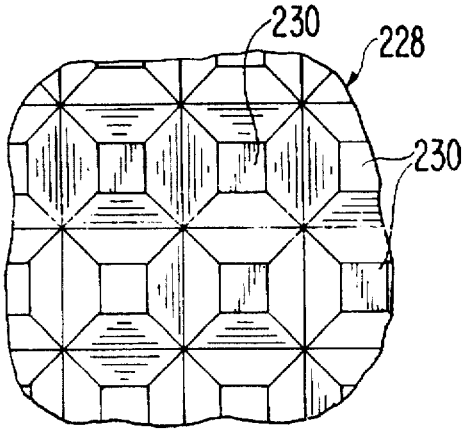
FIG. 6 is a fragmentary plan view showing an alternate embodiment of a molding surface for producing an abrasive grit structure made in accordance with the teachings of the present invention.
Figure 8:
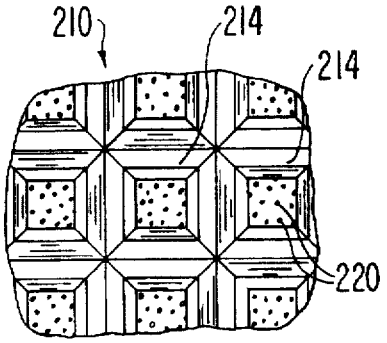
FIG. 8 is a fragmentary plan view of the abrasive grit structure formed by the use of the mold shown in FIG. 6.
Figure 9:
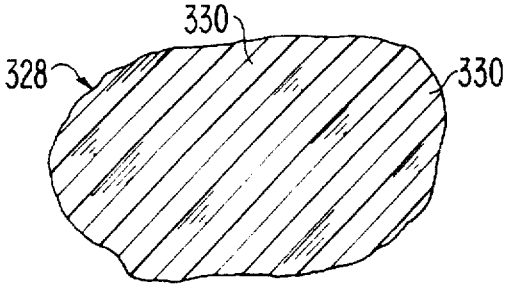
FIG. 9 is a fragmentary view of an alternate embodiment of the mold for producing an abrasive grit structure according to the present invention which produces an abrasive grit surface having parallel rows of grit teeth similar to a file-like configuration.
Figure 10:
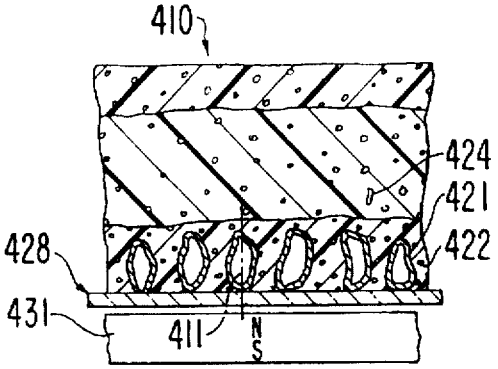
FIG. 10 is a section view showing a further embodiment of an abrasive grit structure made in accordance with the teachings of the present invention whereby the grit particles are arranged with longitudinal axes in substantially parallel relationship.

For instance, in the preferred embodiment of the present invention the mold is in the form of a rectangular planar structure such that rectangular sheets of a grinding structure are produced. As shown in FIG. 1, the indentations are preferably formed in a pyramidal shape in one embodiment which produces a "green" product when bound with the acrylic binder having a series of pyramidal peaks. In an alternate embodiment shown in FIG. 4 the mold structure 128 may be formed to produce a pimpled grit structure as shown in FIG. S. Alternatively, as shown in FIG. 6 the mold 228 may be a truncated pyramidal shape to produce the truncated peak "green" structure of FIG. 8, or as shown in FIG. 9 mold 328 may have rows of sharp indentations 330 to produce a final file-like grit structure having rows of parallel file-like teeth. As shown in FIG. 10 the structure may be fully planar and may be produced on a flat surface without departing from the scope of the present invention. As is readily appreciated, other grit structure shapes such as rows of round top furrows, channel edges, hemispheres and the like may be formed and are within the scope of the present invention, the only criteria being that the shapes formed must be removable from the mold surface.

The mold is preferably produced from a mating suitably machined male surface using a suitable elastomeric compound such as a silicon rubber material or the like.

Figure 4:
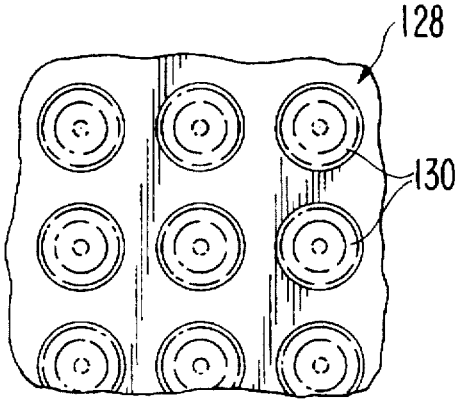
FIG. 4 is a fragmentary plan view of the molding surface used to produce an alternate embodiment of the abrasive grit structure produced in accordance with the teachings of the present invention.
Figure 5:
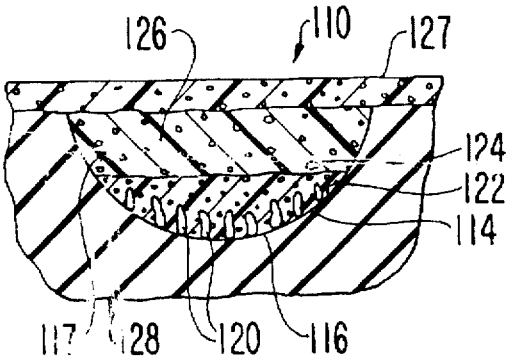
FIG. 5 is a section view of a peak produced in a mold of FIG. 4, the section being taken along a lateral section of a representative peak.
Figure 7:
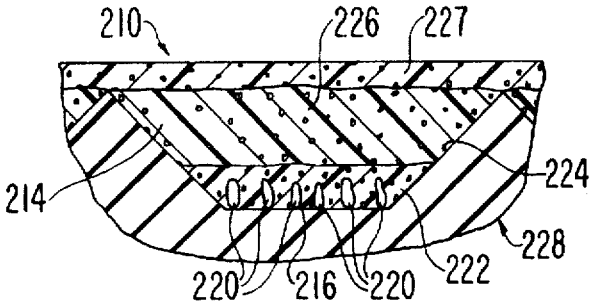
FIG. 7 is a section view of an alternate embodiment of an abrasive grit structure produced in the mold of FIG. 6, the section being taken along a lateral section through the apex of a representative peak.

An alternate embodiment such as that shown in FIGS. 4 and 5 may be advantageous in applications where it is desired that a series of grit particles rather than a single particle are advantageously presented in substantially the same plane at each peak in order to ensure the grit particles contact workpiece along the same plane or circle during use and providing for longer wear life of the structure such that as the apex portion wears down, the grit particles to either side thereof will contact the work surface. Thus, as shown in FIG. 5 a series of grit particles 120 are provided at the peak 116 and therein covered by the setting material 122 and the particulate material 124. Similarly, in the truncated pyramidal shape of FIGS. 6, 7, and 8 a plurality of grit particles 220 are placed at the apex 216 and thereafter covered with a setting material 222 and a particulate material 224. A binder 226 is interspersed therethrough. This produces the green structure as shown in FIG. 8 wherein the peaks 214 each have a series of grit particles 220 at their apexes.

Also provided in the present invention is a process for preparing a bonded abrasive grit structure which is adaptable for brazing to a tool substrate. The method of the present invention includes the following steps to produce the abrasive grit structure herein. A planar mold member of the like described above is provided which has a plurality of concave indentations therein. Thereafter, at least one grit particle is placed in the apex of each of the concave indentations. The concave indentation is then partially filled with a diamond setting powder to a level which covers the diamond grit particle. The remainder of the indentation is filled with a particulate material as described above and compacted therein in any suitable manner to reduce the voids present therein. For instance, the particles may be compacted by vibration of the mold containing the matrix which allows the matrix to settle and compact. The size of the particulate materials used for the setting powders and particulate material constituents are selected such that they may be compressed by such vibration as opposed to the use of pressure which is necessary for very fine powders such as micron or sub micron size powders. While the use of a diamond setting powder is preferred, the present invention may also be practiced by the use of the coarser tungsten carbide particulate matter without deviating from the scope of the present invention. It is believed that a particle size of from about 100 mesh to micron sized particles are suitable for use in the present invention. The particular particle size used is selected for its compatability with the size of the abrasive grit particle used.

The indentations are then saturated with a flexible acrylic binder which provides for adhering the particle structure together when cured. The binder is volatilizable such that it may be later released or driven off from the structure upon heating of the structure for replacement with a brazing compound. The binder is then cured and then the composite structure is then removed from the mold surface.

Figure 11:
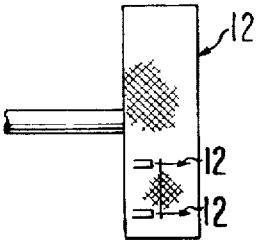
FIG. 11 is a side view of a typical grinding tool having the abrasive grit structure of the present invention attached thereto.

The product obtained from the steps above may then be advantageously formed into an integral grinding tool as shown in FIG. 11 by the following steps. First the structure as formed above is adhered to a tool surface 12 by a tacky adhesive 32 with the diamond grit particles 20 facing outward. This forms a tool grit structure assembly 34. A brazing compound 36 is then applied to the outer surface of the structure. The assembly with the structure attached is then heated at a controlled rate to an effective temperature for driving off the binder. The temperature is then raised to a second effective temperature which is below the temperature of the melting point of the particulate material 24. This melts the brazing compound 36 allowing the braze metal to infiltrate the structure displacing any of the remaining binder 26. This brazes the components of the structure into an integral unit and at the same time brazes the unit onto the tool surface. While the specific temperatures and heating rate for effective volatilization of the binder will be dependent upon the specific binder utilized, it has been found that it is generally necessary to raise the temperature up to about 900°–1000° F. for driving off of the binder. Thereafter the temperature is increased up to a maximum of about 2200° F. the actual temperature selected being dependent upon the specific braze material used, and being sufficient to ensure brazing infiltration of the structure.

Thus, the structure of the present invention may be initially applied and adhered to the tool surface by use of the binder which is used to initially hold the structure together. The flexible nature of the structure allows it to be easily applied around the circumference of a circular tool structure or otherwise applied to various contoured tool shapes and thereafter brazed by the above steps onto the tool by merely heating the tool as set forth above with the grit structure attached.

Alternately, the individual peaks may be broken apart after infiltration of the binder to form individual peaks which can be thereafter arranged and brazed to a substrate tool surface. The structure can also be partially brazed such that the individual particles are brazed together and then the peaks could be broken apart, attached and further brazed to the tool surface.

Alternatively, a planar or shaped tool may be formed by following the brazing step without the presence of the tool thereby creating from the bonded grit structure a flat planar type tool which has a brazing surface on one side thereof. Of course, as will be appreciated by those skilled in the art, other configurations may be formed such as an abrading tool having abrading surfaces on both sides. Various combinations of abrading surfaces could be applied or used in any combination of the present invention to form tools with various types of grinding surfaces.

Referring now to FIG. 10, in an alternate embodiment of the present invention, a planar grit structure 410 may be formed wherein the diamond particles 420 are aligned such that the longitudinal axis 411 of the diamond particles are aligned in generally parallel relationship and which longitudinal axes are generally perpendicular to the plane of the mold surface 428. This allows the individual grit particles to be positioned with their length extending perpendicularly to or radially toward the workpiece, providing for a more useful and longer wearing structure. The embodiment of FIG. 10 is similar to that in the above structures, however, in this embodiment, the diamond particles or grit are coated with a magnetic powder coating 421 and the particles are placed on a flat planar surface such as glass surface 428. Alternatively, grit particles may be used which are made of a magnetically interactive material. A magnet 431 is then placed below the glass surface with either the north pole or south pole of the magnet facing the glass surface. With this arrangement the axis passing through the lengthwise dimension of the particles is perpendicular to the plane of the glass surface. While any substance can be used which is of sufficiently fine particle size and will interact magnetically with the magnet to align these diamonds, a fine magnetic iron oxide powder is presently preferred.

The structures above are new and novel constructions for securing grit structures in a controlled, planar and even fashion in a tool grit structure. In a further embodiment of the present invention shown in FIGS. 14 and 15, the construction may be produced wherein the diamond particles of this embodiment are further exposed and extend out of the surface of the structure after the brazing or heating of the structure to the tool surface. This provides even greater areas of the grit particles to be exposed for grinding while retaining the evenness of the grit particles.

Figure 14:
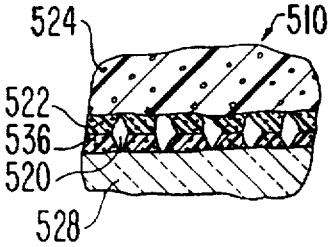
FIG. 14 is a cross-sectional view of a further alternate embodiment of the present invention in a binder wherein the structure exposes a part of the grit particle during subsequent brazing.
Figure 12:
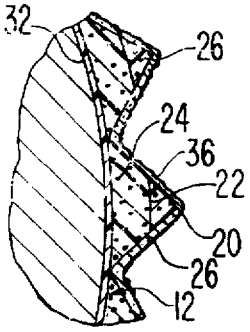
FIG. 12 is a section view taken along lines 12—12 of FIG. 11 showing the abrasive grit structure of the present invention preliminarily attached to a tool.
Figure 13:
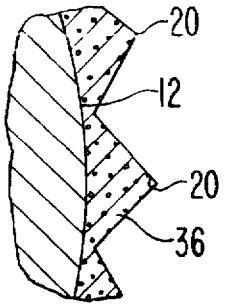
FIG. 13 is a view similar to that of FIG. 12 after the abrasive grit structure has been permanently brazed to the tool surface.
Figure 15:
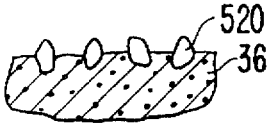
FIG. 15 is a section view of the grit structure of FIG. 14 after brazing thereof.

Referring now to FIGS. 14 and 15 the grit structure of this embodiment is produced as follows. The diamonds 520 are first placed in the mold as disclosed above. Thereafter, a layer 536 of a material which can be later displaced into the structure or displaced by being driven from the structure, is used. The layer 536 which may be of brazing material or volatilizable hydrocarbon resin is first placed into the mold to a point less than about half of the height of the diamond particles. The remainder of the mold is filled as disclosed above either with a first layer of a metal carbide powder setting material 522 thereafter followed by a layer of larger particulate metal carbide matter 524 as disclosed above. Thereafter, the resin binder 526 is applied to infiltrate the entire structure and initially bind it together for later application to a tool. This embodiment allows the brazing material to be included within the structure. The structures may be then applied to the tool and heated as disclosed above to drive off the volatilizable resin material and allow the brazing compound to infiltrate and bind together the tool and the grit structure. However, unlike the prior embodiments, in this embodiment the brazing material of layer 536 will infiltrate into the structure thereby leaving the space of layer 536 where it previously had taken up in the structure. This exposes the diamonds 520 or grit particles to the extent of the layer 536 of the brazing materials or resin. Thus, this structure provides a new and advantageous structure which allows the diamond particles to be securely held on the one hand and yet allows substantial portions of their cutting surfaces to be exposed for greater contact with the work surface and therefore, greater shaping of the surface.

In operation, the grit structures of the present invention allow the final structure to have grit cutting particles at a substantially even height. The resulting structure presents the grit particles to the workpiece at substantially the same level thereby providing efficient grinding of the surface.

As will be readily appreciated the structures of the present invention may be manufactured in resin bonded sheets which can be stored or immediately attached to the desired tool surface. The grit structures of the present invention may be easily attached to the substrate tool via conventional brazing ovens employing a suitable reducing atmosphere without the necessity of costly use of pressurized molds.

While the invention has been described in an illustrative manner it is to be understood that the terminology which has been used is intended to be that of description rather than of limitation. Obviously, many modifications and variations of the present invention are possible in light of the above teachings. It is therefore to be understood that within the scope of the appended claims, the invention may be practiced otherwise than as specifically described.

What is claimed is:

1. A bonded abrasive grit structure which is selectively attachable to a tool surface, said structure comprising:

a plurality of peaked portions, said peaked portions each having an apex and a base portion, each of said peaked portions having at least one abrasive grit particle at said apex said peaked portions being substantially equal in height, said abrasive grit particle being substantially surrounded in said apex by a setting material, comprising particulate matter having a melting point higher than a predetermined value;

a hydrocarbon resin binder dispersed throughout said structure for temporarily binding together the abrasive grit particles and said setting material, said hydrocarbon resin binder being drivable from said structure at a first relatively low predetermined temperature, said structure being brazable to a tool surface by the infiltration of a brazing material therethrough and onto said tool surface at a second higher temperature which is lower than the melting point of said particulate matter.

2. The bonded abrasive grit structure of claim 1 wherein said setting material further comprises a first layer of fine particles substantially surrounding said grit particle, and a second layer including coarser particles in the remainder of said peaks.

3. The bonded abrasive grit structure of claim 1 wherein said abrasive grit particle is a particle selected from the group consisting of diamond particles, particles made from crushed cast tungsten metal group carbides, particles made from crushed sintered tungsten group of carbides that are bonded with cobalt, cubic boron nitride particles and mixtures thereof.

4. The bonded abrasive grit structure of claim 1 wherein said grit particles are of a magnetically interactive material or are covered with a magnetic interactive coating and are axially aligned with the axes through the length of the grit particles perpendicular to a plane passed through the peaks of said structure.

5. A process for preparing a bonded abrasive grit structure adaptable for brazing to a tool substrate comprising the steps of:

(a) providing a mold member having a plurality of concave indentations therein;

(b) placing at least one abrasive grit particle in each of said concave indentations;

(c) filling said concave indentations with a setting matrix to a level for covering of said abrasive grit particle and filling of said indentations;

(d) saturating the indentations with a resin binder for adhering said structure together, which resin binder may later be released or driven off from said structure;

(e) curing said binder; and (f) removing said structure from said mold member.

6. The product produced by the process of claim 5.

7. The process according to claim 5 further comprising the step of compacting the setting matrix of step c prior to step d.

8. The process according to claim 7 wherein said compacting step is accomplished by vibration of the mold member.

9. The process according to claim 5 wherein said abrasive grit particle is selected from the group consisting of diamond particles, particles made from crushed cast tungsten metal group carbides, particles made from crushed sintered tungsten group of carbides that are bonded with cobalt, cubic boron nitride particles and mixtures thereof.

10. The process according to claim 5 wherein step c further comprises first partially filling said concave indentation with a diamond setting powder having a particle size of less than about 325 mesh and thereafter filling the remainder of said indentations with a material having a particle size of greater than 325 mesh.

11. The process according to claim 5 further comprising the additional steps of:

(g) adhering the structure of step f to a tool surface with the abrasive grit particles facing outward for forming a tool grit assembly;

(h) applying a brazing compound to the outer surface of said structure;

(i) heating said assembly to an effective temperature for driving off said binder; and (j) raising said temperature to a second effective temperature below a predetermined melting temperature of said setting matrix of step c for allowing melting of said brazing compound without melting of said setting matrix said brazing compound infiltrating said setting matrix and attaching said grit structure to said tool surface.

12. The process of claim 11 wherein said brazing compound comprises a nickel chromium brazing alloy.

13. The product produced by the process of claim 11.

14. The product produced by the process of claim 12.

15. A process for preparing a tool having a grit surface thereon comprising:

(a) providing a mold member having a plurality of concave indentations each of said concave indentations having an apex forming base therein, said concave indentations being substantially equal in depth;

(b) placing at least one abrasive grit particle in each of said concave indentations;

(c) partially filling said concave indentations with a setting material to a level for covering of said abrasive grit particle;

(d) substantially filling the remainder of said indentations with a substantially non-melting carbide particle material;

(e) saturating the indentations with a solvent containing a flexible resin binder for adhering said particle structure together which binder may later be released from said structure;

(f) curing said binder, (g) removing said structure from said mold surface;

(h) placing said structure of step g on a tool surface with the portions formed by said indentations facing outwardly;

(i) applying a brazing material to said protruding portions of said structure;

(j) heating the product of step i to an effective temperature for driving off said binder; and (k) increasing the temperature of said assembly for causing said brazing material to melt and infiltrate said structure thereby brazing the particles together and brazing said structure to said tool.

16. The process according to claim 15 further comprising the step of compacting the product of step d, prior to step d.

17. The process according to claim 16 wherein said compacting is accomplished by vibrating the mold member.

18. The product produced by the process of claim 15.

19. A process for preparing a bonded abrasive grit structure comprising the steps of (a) providing a substantially planar mold surface;

(b) placing a layer of abrasive grit particles on said mold surface;

(c) applying a first layer of a brazing compound to a thickness of about one half or less of the height of said abrasive grit particles;

(d) applying a second layer of non-melting particles of grit particle setting constituents to a height equal to or greater than said height of said diamond particles;

(e) saturating the product of step d with a resin binder, said binder being volatile at a temperature below that of said brazing material; and (f) allowing said binder to cure.

[20. The product produced by the process of claim 19.]

21. The process according to claim 19 wherein said abrasive grit particles are aligned on said mold surfaces with their longitudinal axes perpendicular to the mold surfaces by providing grit particles which are precoated with a magnetically interactive material and said mold surface is placed in a magnetic field having a single pole of the magnet substantially adjacent the entire area of said mold surface prior to distributing said grit particles in the mold.

[22. The product produced by the process of claim 21.]

23. The process according to claim 19 further comprising the steps of:

(g) removing the product of step f from said mold surface;

(h) adhering the product of step g to a tool surface with a binder; and (i) incrementally heating the product of step h to a first predetermined temperature for driving off said binder and then to a second predetermined higher temperature for allowing said brazing compound to infiltrate the structure and adhere the structure to the tool in an integral mass whereby the outer portions of the abrasive grit particles formerly surrounded by the brazing material are exposed by said infiltration of said brazing material into the structure.

[24. The product produced by the process of claim 23.]

25. The process according to claim 21 further comprising the steps of:

(g) removing the product of step f from said mold surface;

(h) adhering the product of step g to a tool surface with a volatilizable binder; and (i) incrementally heating the product of step h to a first temperature for driving off said binder and then to a second higher temperature for allowing said brazing material to infiltrate the structure and adhere the structure to the tool in an integral mass whereby the outer portions of the abrasive grit particles formerly surrounded by the brazing material are exposed by said infiltration of said brazing material.

[26. The product produced by the process of claim 25.]

27. A bonded abrasive grit structure which is selectively attachable to a tool surface by brazing, said structure comprising:

a plurality of peaked portions, said peaked portions each having an apex and a base, the apexes of said plurality of peaked portions being substantially of equal height;

at least one abrasive grit particle positioned in each of said apexes;

a first layer of a displaceable material for covering a portion of the height of said grit particle extending from said apex toward said base;

a second layer of particulate matter for filling the remainder of each peak, said particulate matter having a melting point greater than the melting point of a brazing compound to be used, said particulate matter and said brazing compound and said abrasive grit particle being selected to provide for subsequent brazing into a homogeneous structure; and a flexible hydrocarbon resin binder dispersed throughout said structure for temporarily binding together the abrasive grit particle, said first layer and said particulate matter, said hydrocarbon resin binder being drivable from said structure at a first predetermined temperature, said structure being selectively attachable to a tool surface by infiltrating brazing material through said structure and onto said tools after exposing said structure to a second higher predetermined temperature for brazing of said structure, said structure exposing less than about half of said grit particle after heating of said structure and displacing said first layer.

28. The bonded abrasive grit structure of claim 27 wherein said first layer is a brazing compound.

29. The bonded abrasive grit structure of claim 27 wherein said first layer is a hydrocarbon resin binder.

30. A process for preparing an abrasive grit structure which is selectively attachable to a tool structure;

(a) providing a magnetically permeable mold surface wherein grit particles can be distributed thereon along the same plane in a substantially coplanar manner;

(b) distributing magnetically interactive grit particles thereon;

(c) aligning said particles on said mold surface such that the axis passing through the length of said particles is perpendicular to said mold surface by placing one pole of a magnet substantially adjacent to said mold surface;

(d) applying a layer of particle setting matrix over and around said grit particles;

(e) infiltrating the product of step d with a resin binder for temporarily holding and binding said grit particles and said setting particulate matter together into a bound structure; and (f) allowing said binder to cure and removing said structure from said mold.

31. The process according to claim 30 wherein said particle setting matrix further comprises a first layer of displaceable material for covering up to about one half the height of said grit particles and a second layer of a tungsten carbide particle matrix for covering said grit particles over the height of said grit particles.

32. The process according to claim 30 wherein said particle setting matrix further comprises a first layer of metal carbide particles of a size less than 325 mesh for substantially surrounding said grit particles and a second layer on top of said first layer comprising metal carbide particles of about 325 mesh or greater.

33. The process according to claim 30 wherein said mold surface is a flat planar surface.

34. The process according to claim 30 wherein said mold surface has a plurality of concave indentations therein, the lowermost portion of each of said indentations being co-planar, at least one of said abrasive grit particles being positioned in each of said lowermost portions of said concave indentations.

35. The process according to claim 31 wherein said displaceable material is a brazing compound.

36. The process according to claim 31 wherein said displaceable material is a resin binder.

* * * * *